June 22, 1926.
F. P. DIERKES
1,590,087
GAUGE APPARATUS
Filed Oct. 1, 1923
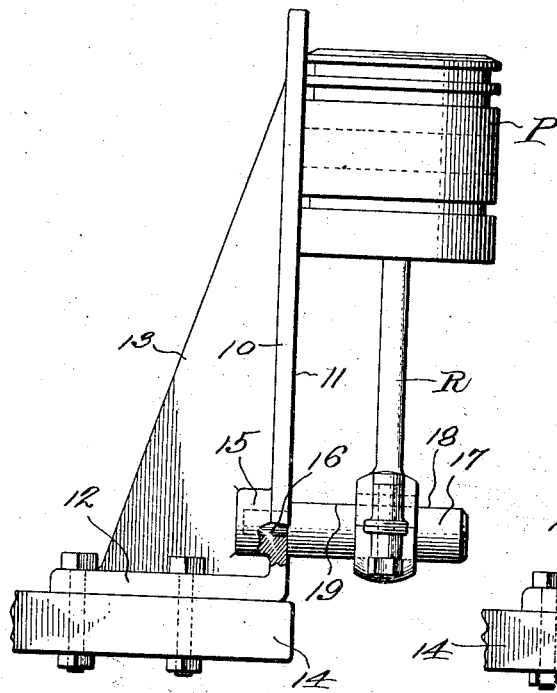
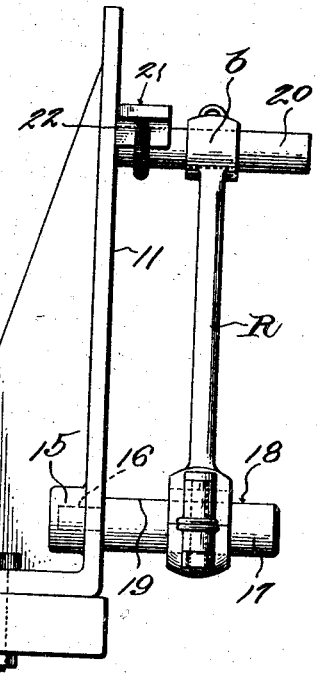
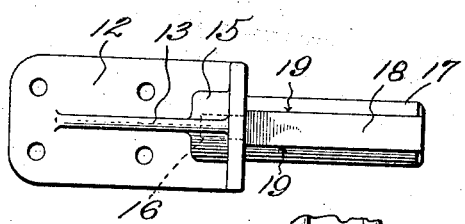
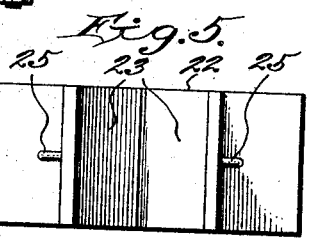
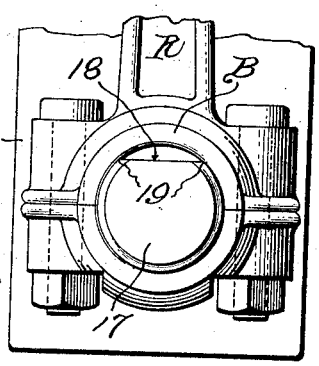
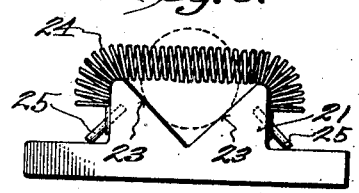
F. P. Dierkes, INVENTOR
BY Victor J. Evans ATTORNEY Patented June 22, 1926.

1,590,087

UNITED STATES PATENT OFFICE.

FRANK P. DIERKES, OF WILKES-BARRE, PENNSYLVANIA.

GAUGE APPARATUS.

Application filed October 1, 1923. Serial No. 666,021.

This invention relates to improvements in means for testing connecting rods of engines to determine whether or not the bearings at opposite ends of the rods are in proper relative positions.

Another object is the provision of means of this character which is simple in construction and use and by means of which the axial relation between the bearings may be accurately determined.

With the above and other objects in view, the invention further includes the following novel features and details of construction, to be hereinafter more fully described, illustrated in the accompanying drawings and pointed out in the appended claims.

In the drawings:—

Figure 1 is an elevation partly broken away illustrating the use of the invention.

Figure 2 is a view similar to Figure 1 showing a slightly different form of invention.

Figure 3 is a top plan view with the connecting rod removed.

Figure 4 is an enlarged fragmentary elevation at right angles to Figures 1 or 2.

Figure 5 is a plan view of the wrist pin block shown in Figure 2 with the retaining spring removed.

Figure 6 is an edge view with the spring in place.

Referring to the drawings in detail wherein like characters of reference denote corresponding parts, the reference character 10 indicates a standard or support which may be of any suitable type but which must be provided with a flat gauge face 11. The standard as shown is substantially L-shaped and provides a vertical portion upon which the gauge face 11 is formed and a horizontal portion or base 12, the latter being connected to the former by means of a web 13. The support 10 may be attached to a bench, table or other structure, a portion of which is indicated at 14.

The support 10 has extending inwardly from the gauge face 11 a socket 15 which receives the reduced end 16 of a pin 17, the latter being of a diameter to conform to the diameter of the bearing of the connecting rod to be tested. The pin 17 is formed with a longitudinally disposed flattened portion 18 which provides spaced contact edges 19.

In testing the connecting rod as shown at R in Figure 1 of the drawings, the piston P may remain connected with the rod. The bearing B of the rod R is slipped over the pin 17 and the piston moved into contact with the gauge face 11. If the rod is true, the piston P will engage the gauge face throughout the length of the piston and the contact edges 19 of the pin 17 will engage the bearing B throughout the length of the latter. If the contact edges engage the bearing and the piston does not properly engage the gauge face, it will indicate that the rod is warped or twisted.

In the form of the invention shown in Figures 2, 5 and 6, the rod R is tested with the piston removed. For this purpose there is provided a pin 20 which is passed through the wrist pin of the bearing b and the connecting rod. Mounted upon the pin 20 is a block 21 which has a relatively long contact face 22 and which is provided with a V-shaped notch 23 for engagement over the pin 20 so that the latter will engage the block at spaced points of contact as shown by the dotted lines in Figure 6. A spring 24 which has its opposite ends engaged over pins 25 carried by the block 21 acts to yieldingly hold the block and pin in contacting position.

When the end of the pin 20 and the face 22 of the block are brought into contact with the gauge face 11, if the rod R is true, proper contact of the edges 19 and the bearing B will occur as will also proper contact between the walls of the V-shaped notch 23 and the pin 20 at spaced points.

The invention is susceptible of various changes in its form, proportions and minor details of construction and the right is herein reserved to make such changes as properly fall within the scope of the appended claims.

Having described the invention what is claimed is:—

1. A connecting rod testing device comprising a structure having a flat gauge face, a pin extending therefrom for engagement within the crank shaft bearing at one end of said rod, said pin having a flattened portion extending longitudinally of the pin to provide spaced edges for contact with said bearing and means engageable with the other end of said rod for contact with the gauge face when said rod is supported on said pin.

2. A connecting rod testing device comprising a structure having a flat gauge face, a pin extending therefrom for engagement by one end of the connecting rod, a pin extending through the crank shaft bearing at the opposite end of the rod, a block carried by the pin and having a V-shaped seat to provide circumferentially spaced pin engaging points, a contact face included in the block and disposed at right angles to the seat and means for yieldingly holding the block in engagement with the pin.

In testimony whereof I affix my signature.

FRANK P. DIERKES.